United States Patent [19]
Hughes

[11] 3,851,355
[45] Dec. 3, 1974

[54] CONTINUOUS MEAT FORMING APPARATUS

[75] Inventor: Alvin W. Hughes, Bensenville, Ill.

[73] Assignee: A. W. Hughes Company, Inc., Addison, Ill.

[22] Filed: Feb. 28, 1973

[21] Appl. No.: 336,637

[52] U.S. Cl. ................................................ 17/32
[51] Int. Cl. ............................................ A22c 7/00
[58] Field of Search ...................... 17/32; 425/444

[56] References Cited
UNITED STATES PATENTS
2,183,977  12/1939  Sopchack ............................... 17/32
2,708,287  5/1955  Long et al. ............................. 17/32

*Primary Examiner*—Robert Peshock
*Attorney, Agent, or Firm*—Wolfe, Hubbard, Leydig, Voit & Osann, Ltd.

[57] ABSTRACT

A meat forming apparatus of the rotatable wheel type including a plurality of cavities disposed about its peripheral surface, wherein freely movable piston means are disposed in each of the cavities, each cavity being generally T-shaped in cross section having an enlarged pocket portion adjacent the peripheral surface of the wheel and a radially extending bore. The pistons also being correspondingly, generally T-shaped in cross section including an enlarged head and a tubular shank are constrained within the cavities yet free to move between the outer and inner positions by means of arm members extending transversely through elongated openings in the wheel. Trip arms disposed outboard of the wheel present cam surfaces which engage the outwardly projecting arms when the wheel rotates to urge the pistons radially outward to reject a molded meat product.

4 Claims, 3 Drawing Figures

CONTINUOUS MEAT FORMING APPARATUS

DESCRIPTION OF THE INVENTION

This invention relates generally to apparatus for molding or forming meat patties on a high production basis, and more particularly concerns an improved continuous meat forming apparatus which is extremely simple in construction, easy to clean and minimizes the operating components.

For many years numerous different types of machines have been proposed and made for forming meat patties and the like on a commercial production basis. Typically, the various commercial patty making machines employ complex mechanisms that compress the meat into a die cavity and then eject the formed meat onto a conveyor; such machines being extremely costly, very complex and quite noisy in operation. On the other hand, numerous attempts have been made to simplify patty making machines by employing a rotatable wheel having a plurality of peripheral cavities which rotate past an arcuate guide or pressure plate through which the meat product is fed to fill the cavities passing by the plate. Each cavity contains a piston arrangement which is permitted to move radially inward on receiving the meat batter and some type of mechanism is provided to actuate the piston to push the patty out from the cavity at a discharge position such as onto a conveyor disposed beneath the wheel.

The complexities of these various patty wheel arrangements have varied from the most simple typified by Lilien U.S. Pat. No. 2,528,234 which employs a pair of oppositely directed pistons interconnected by a shaft, to the much more complicated arrangements of Burnett et al. U.S. Pat. No. 2,651,808; Vogt U.S. Pat. No. 2,666,229; Miller et al. U.S. Pat. No. 3,122,869; Dezolt U.S. Pat. No. 3,137,029; Merrels U.S. Pat. No. 3,312,997; Nishimura U.S. Pat. No. 3,408,962; and Lilien U.S. Pat. No. 3,504,639 that employ centrally located cam arrangements for moving the pistons radially outward at predetermined locations to eject the meat patty.

While in principle, all of the aforementioned arrangements appear capable of producing satisfactory meat patties one drawback that has been encountered is the previous lack of an altogether satisfactory manner of uniformly and continuously supplying the meat product to be formed so that the cavities are filled with each patty produced being complete and uniform in thickness and density. Incomplete filling or lack of uniformity results in a substantial number of rejects and inconsistency as to the number of patties per pound. There is disclosed and claimed in Alvin W. Hughes U.S. Pat. No. 3,670,362 A Stuffing Apparatus for Sausage Batter and the Like wherein a single cylinder and piston arrangement maintains a constant pressure upon meat batter entering the cylinder through an aperture in the piston so that the outflow from the apparatus is uniform and continuous.

Accordingly, it is a primary object of the present invention to provide an improved continuous meat forming apparatus which is simple and low in cost of production and may be easily disassembled and assembled for cleaning.

It is another object of the invention to provide an improved meat forming apparatus of the wheel and piston type which eliminates costly cam and follower arrangements internally disposed in the wheel, yet which enables a plurality of pistons to be provided about the periphery of the wheel for forming meat on a high production basis.

It is still another object of the present invention to provide an improved meat forming apparatus capable of operating smoothly and quietly on account of the minimized number of moving parts in the structure but at the same time retains the versatility and high production performance of such apparatus.

Other objects and advantages of the invention will become apparent by reference to the following detailed description and the accompanying drawings.

While the invention will be described in connection with a certain preferred embodiment, it will be understood that it is not intended to limit the invention to the particular illustrative embodiment. On the contrary, it is intended to cover all alternatives, modifications and equivalent arrangements as may be included within the spirit and scope of the invention.

DETAILED DESCRIPTION

Figure 1:
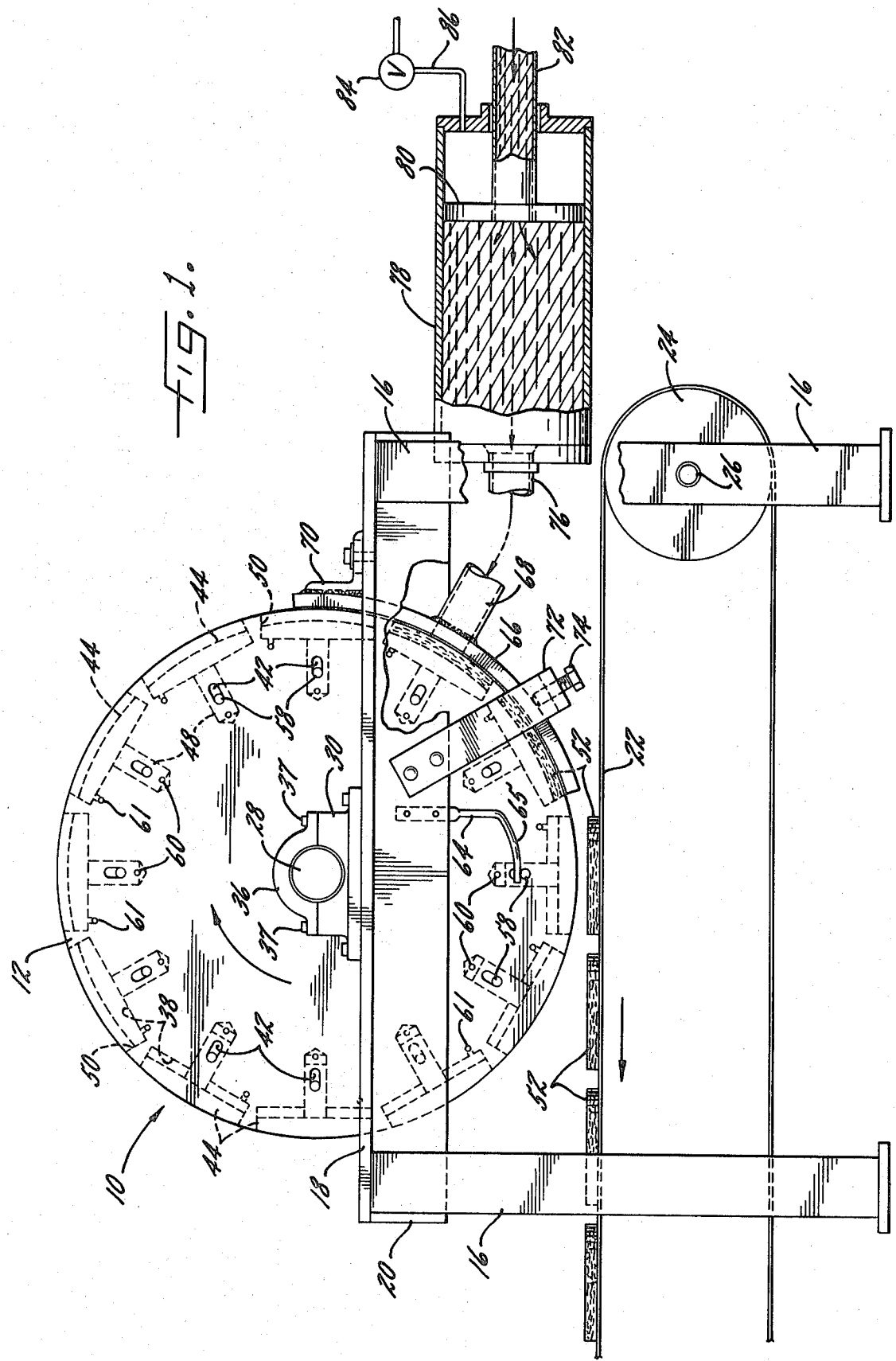
FIG. 1 is a reduced side elevational view of a continuous meat forming apparatus constructed in accordance with the present invention and shown connected with a continuous piston stuffer for supplying the meat batter to the apparatus.

Turning now to the drawings, there is illustrated in FIG. 1 an illustrative embodiment of the continuous meat forming apparatus, indicated generally at 10, in the form of a rotatable wheel 12 supported on a frame including spaced upright columns 16 interconnected at the sides by L-shaped cross braces 18 and at the ends by transverse braces 20. The wheel is mounted on the frame in an elevated position so that a conveyor 22 may be disposed between respective pairs of columns beneath the wheel. In the illustrative arrangement, the conveyor is in the form of an endless belt trained around a rotatable drum 24 carried by a shaft 26 journalled to a pair of columns 16.

In order to rotatably mount the wheel 12, a transverse drive shaft 28 is provided with the shaft being journalled to pillowboxes 30 carried by braces 18. At one side, the shaft 28 projects beyond a pillowbox (FIG. 2) and a pulley 32 is mounted on the outboard end to receive a belt 34 from a driving motor (not shown).

For the purpose of easily installing and removing the wheel 12 from the supporting structure, the pillowboxes 30 are of the split type with the upper portion 36 being held in place by a pair of bolts 37.

In carrying out the present invention the patty wheel includes a plurality of cavities 38 disposed about its peripheral surface. For example, with an 18 inch diameter wheel, twelve 4 inch diameter cavities may be disposed about the periphery wheel at 30° angular locations measured from center to center of the cavities.

Figure 3:
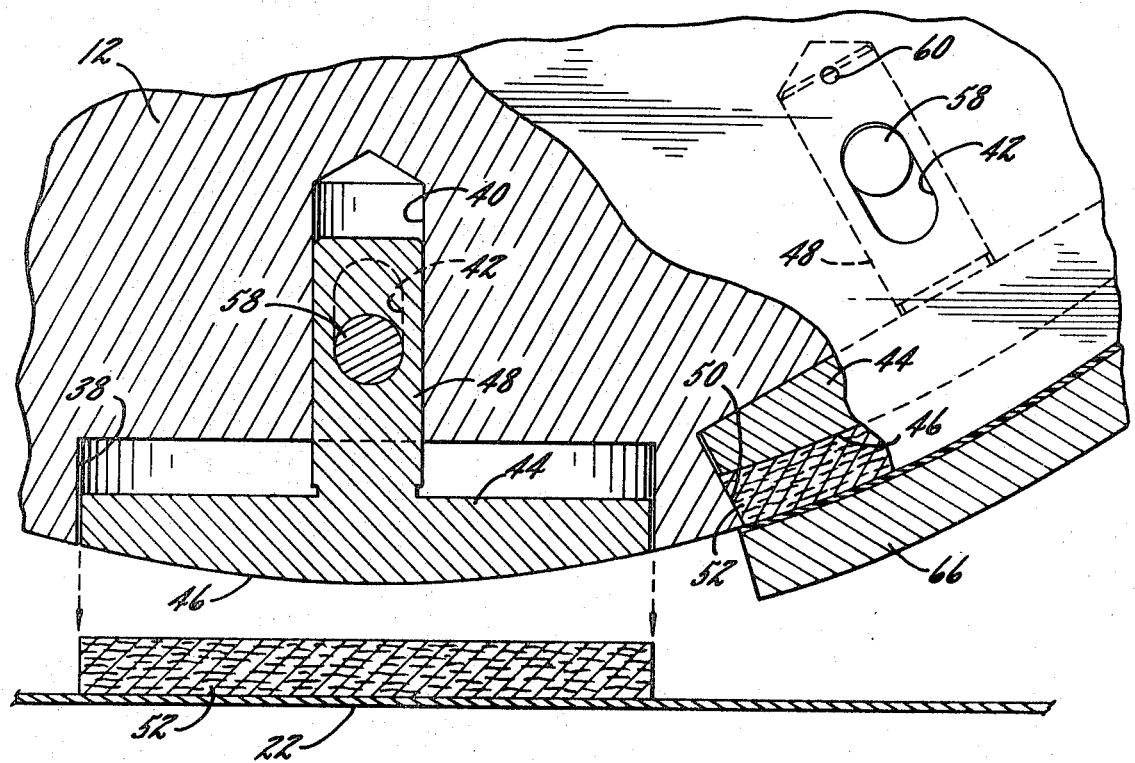
FIG. 3 is an enlarged partly sectional view of a portion of the patty wheel here showing a pair of the pistons one of which is in readiness for discharge of the formed patty.

The cavities 38 are generally T-shaped in cross section with an enlargd pocket portion adjacent the surface and a radially extending smaller bore 40. Transverse elongated openings 42 pass through the wheel intercepting the small bores 40 (FIG. 3).

In accordance with one aspect of the present invention, piston members 44 are adapted to reciprocably confined in the cavities in an easy to assemble and remove manner. Each piston member 44 includes an enlarged annular head 46 the outer surface of which has a radius of curvature corresonding to the radius of curvature of the wheel and a tubular shank 48 secured perpendicular to the undersurface of the head and adapted to project into the smaller diameter bore of the cavity. The cross sectional dimensions of the head are such that when completely recessed within a cavity a constant thickness annular space 50 is provided between the surface of the piston head and the outer periphery of the wheel. This space when filled with meat forms the patty 52.

Figure 2:
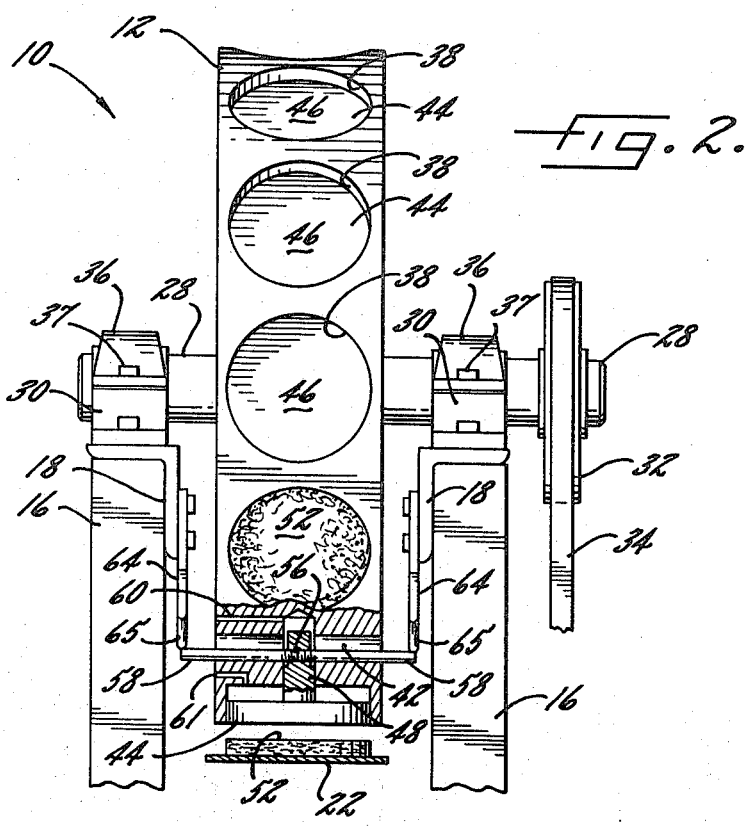
FIG. 2 is a partial fragmentary front view of the apparatus in FIG. 1 with portions being in section.

As best shown in FIG. 2 the lower end of the piston tubular shank 48 is flattened and a transverse threaded opening 56 is provided to correspond with the elongated openings 42 transversely disposed in the patty wheel 12.

To secure the pistons reciprocably in the cavities, there is provided a pair of arms 58 having threaded ends which pass through the patty wheel elongated openings 42 and threadably engage the threaded transverse opening 56 in the piston tubular shank. With the arms thus secured to the piston tubular shank the piston 44 is constrained within the cavity 38, but free to move between a radially forward position where the curve face of the piston is even with the periphery of the wheel and a rearward position where the forward face of the piston defines the cavity space 50 (FIGS. 1 and 3).

In order to provide for free movement of the pistons 44 without compression or suction action taking place to interfere with the movement of the pistons, weep holes 60, 61 are included, respectively, in the patty wheel leading to the smaller bores 40 and enlarged pocket portions of T-shaped cavities 38.

In carrying out the present invention, means are provided exterior of the patty wheel for positively urging the piston radially outward to eject a patty when the piston is in the lowermost position of the wheel adjacent the conveyor 22. To this end, a pair of trip arms 64 are secured to braces 18 at opposite sides of the patty wheel 12 (FIGS. 1 and 2). The arms 64 have a bent over downwardly extending end portion 65 defining a cam surface which is arranged so that the arm 58 connected to the piston 44 on the same side as the arm will engage the cam surface 65 as the wheel rotates causing the arm and the piston to move downwardly.

For the purpose of enabling the filling of the annular spaces 50 to form the patties, there is provided an arcuate guide 66 having an inlet conduit 68 formed therein. The upper end of the guide is held adjacent to the periphery of the wheel via an L-shaped cross member 70 bolted to the braces 18. The lower end of the arcuate guide 66 is adjustably held in conformity with the wheel periphery by means of a U-shaped bracket 72 secured to braces 18 with the lower base of the bracket having an adjustment bolt 74 passing through a threaded opening therein and engaging the guide. The arrangement is such that the bolt 74 may be tightened or loosened to adjust the clearance between the guide and the wheel periphery.

In order to continuously supply the inlet conduit 68 of the guide with meat product, the conduit is connected to the outlet 76 of the aforementioned stuffing apparatus disclosed and claimed in Alvin W. Hughes U.S. Pat. No. 3,670,362. In general, the stuffer comprises a single cylinder 78 having a reciprocable piston 80 disposed therein with the piston having a central opening connected to an inlet conduit 82 which is also reciprocably mounted to the cylinder. A fluid pressure source (not shown) acting through valve 84 and pipe 86 maintains a pressure on the inlet side of the piston with the pressure being slightly less than or equal to the pressure applied to the batter on the outlet side of the piston. With this arrangement the batter discharge is uniform in rate and continuous throughout its operation.

In order to more fully understand the operation of the patty wheel of the present invention, a brief description of the typical operating cycle is as follows referring to FIG. 1. Batter being supplied from the stuffing apparatus to the guide 66 inlet conduit 68 the patty wheel 12 is rotated in the clockwise direction as shown in FIG. 1. As the cavity in the wheel moves adjacent the inlet opening of the guide meat under pressure is forced against the piston 44 urging it radially inward and completely filling the annular space 50 to form the patty 52. As the cavity continues to rotate past the guide the arms 58 engage the cam surface 65 of trip arm 64 which move the piston downwardly to eject the patty 52 onto the conveyor 22. With the rotation of the wheel when the cavities approach the top positions gravity tends to move the pistons radially inwardly to expose the annular cavities 50 for filling. However, even though meat on the side wall may cause some sticking, the fact that the pistons are freely mounted, yet constrained, they will move radially inwardly at least to some extent. The pressure of the batter entering the cavity when it is adjacent the guide inlet insures that the pistons do fully retract inwardly to provide patties of the same thickness throughout the operation of the wheel.

It will be appreciated by those skilled in the art that while the invention has been disclosed with a single row of cavities in the wheel, a plurality of rows may be provided to increase the number of patties formed at one time. Also, it will be appreciated that the shape of the cavities may be varied to form other shaped meat products besides the patty shape of the illustrative embodiment.

I claim as my invention:

1. In a meat forming apparatus having a rotatable wheel carried by a central shaft and mounted on an upright framework, said wheel having a plurality of cavities disposed radially about its peripheral surface, piston means disposed in each of said cavities, an arcuate guide having an inlet conduit therein positioned adjacent the peripheral surface of said wheel, a continuous source of meat product connected to said guide inlet for supplying the meat product thereto and means for rotating the wheel, the improvement comprising, the wheel cavities each being generally T-shaped in cross section including an enlarged pocket portion adjacent the peripheral surface of the wheel and a radially extending bore, means defining at least one transverse elongated opening passing through the wheel and intercepting each said bore, said pistons each being correspondingly, generally T-shaped in cross section including an enlarged head and a tubular shank, said shank having a threaded opening therein positioned adjacent to said transverse elongated opening, an arm member having a threaded end disposed in said elongated opening and threadably attached to the piston shank, said arm projecting axially, outwardly from said wheel, means including a trip arm carried by the framework adjacent one side of the wheel and having a cam surface thereon adapted to be engaged by said outwardly projecting arms when the wheel rotates thereby urging the pistons connected to said arms radially outward to eject a molded meat product from said mold cavities.

2. A meat forming apparatus as claimed in claim 1 wherein the wheel includes a second elongated opening opposite said other elongated transverse opening for each cavity and a second arm member and trip arm are disposed on the other side of said wheel.

3. A meat forming apparatus as claimed in claim 1 wherein said central shaft is journably mounted on the upright framework with split pillow boxes, said split pillow boxes having removable upper portions for installing and removing the wheel with respect to the remaining portion of the pillow boxes.

4. A meat forming apparatus as claimed in claim 1 wherein the guide includes one end fixably supported to the frame, a generally U-shaped bracket connected to said frame adjacent the other end of said guide and adjustment means connected to said bracket bearing against said other end of the guide for varying the clearance between the guide and the wheel periphery.

* * * * *